United States Patent
Odaka et al.

(10) Patent No.: US 7,423,111 B2
(45) Date of Patent: Sep. 9, 2008

(54) REACTING ALKYLENE OXIDE WITH ACTIVE HYDROGEN INITIATORS TO PRODUCE POLYOXYALKYLENES

(75) Inventors: Hidetoshi Odaka, Hyogo (JP); Hiroshi Iwakiri, Hyogo (JP)

(73) Assignee: Kaneka Corporation, Osaka-Shi (JP)

( * ) Notice: Subject to any disclaimer, the term of this patent is extended or adjusted under 35 U.S.C. 154(b) by 269 days.

(21) Appl. No.: 10/586,316

(22) PCT Filed: Jan. 26, 2005

(86) PCT No.: PCT/JP2005/001022

§ 371 (c)(1),
(2), (4) Date: Jul. 14, 2006

(87) PCT Pub. No.: WO2005/073275

PCT Pub. Date: Aug. 11, 2005

(65) Prior Publication Data

US 2007/0173632 A1    Jul. 26, 2007

(30) Foreign Application Priority Data

Jan. 30, 2004    (JP)    .............................. 2004-024168

(51) Int. Cl.
C08G 65/08    (2006.01)
C08G 65/10    (2006.01)
C08G 65/14    (2006.01)
C08G 65/22    (2006.01)
C08G 65/24    (2006.01)
C08L 71/02    (2006.01)

(52) U.S. Cl. ........................ 528/412; 525/403; 525/409; 528/421

(58) Field of Classification Search ........................ None
See application file for complete search history.

(56) References Cited

U.S. PATENT DOCUMENTS 4,987,271 A * 1/1991 Watabe et al. ............... 568/621
5,223,583 A    6/1993    Higuchi et al.
5,286,780 A    2/1994    Iwakiri et al.
6,153,794 A *  11/2000   Funaki et al. .................. 564/14
6,248,915 B1 * 6/2001    Ito et al. ...................... 556/445
6,437,071 B1 * 8/2002    Odaka et al. .................. 528/15
7,144,953 B2 * 12/2006   Ueda et al. ................... 525/100
7,151,128 B2 * 12/2006   Fujimoto et al. ............. 524/404
7,182,833 B2 * 2/2007    Ando et al. .................. 156/329

FOREIGN PATENT DOCUMENTS

| JP | 04-216823 A | | 8/1992 |
| JP | 05-065406 A | | 3/1993 |
| JP | 09-095609 A | | 4/1997 |
| JP | 09-095619 A | | 4/1997 |
| JP | 10-036500 A | | 2/1998 |
| JP | 10-36500 A | * | 2/1998 |

OTHER PUBLICATIONS

Derwent accession No. 1992-311926 for Japanese Patent No. 4-216823, Matsumoto et al., Aug. 6, 1992, one page.*
Caplus accession No. 1993:81621 for Japanese Patent No. 4-216823, Matsumoto et al., Aug. 6, 1992, one page.*

* cited by examiner

*Primary Examiner*—Robert Sellers
(74) *Attorney, Agent, or Firm*—Brinks Hofer Gilson & Lione

(57) ABSTRACT

The problem is to efficiently produce an active hydrogen group-containing oxyalkylene polymer as a starting material of a hydrolyzable silicon group-containing oxyalkylene polymer which has a low viscosity while maintaining a plasticity of a cured product and which does not contaminate an area around a sealing portion and/or has no adverse effect on an adhesion. The problem is dissolved by a process for producing an oxyalkylene polymer in which a first oxyalkylene polymer having at least two active hydrogen groups and a second oxyalkylene polymer having one active hydrogen group coexist, which process comprises reacting an alkylene oxide using a first initiator having at least two active hydrogen groups and a second initiator having one active hydrogen group in the presence of a catalyst.

9 Claims, No Drawings

REACTING ALKYLENE OXIDE WITH ACTIVE HYDROGEN INITIATORS TO PRODUCE POLYOXYALKYLENES

RELATED APPLICATIONS

This application is a nationalization of PCT application PCT/JP2005/001022 filed on Jan. 26, 2005, claiming priority based on Japanese Application No. 2004-024168filed on Jan. 30, 2004, the contents of which are incorporated herein by reference in their entirety.

TECHNICAL FIELD

The present invention relates to a process for producing an oxyalkylene polymer.

BACKGROUND ART

An oxyalkylene polymer obtained by a ring-opening reaction of an initiator and a monoepoxide such as an alkylene oxide is liquid at room temperature and a crosslink-cured product maintains a plasticity even at a relatively low temperature. Accordingly, it has found wide acceptance in a starting material for sealing materials, adhesives and the like. As an example of the oxyalkylene polymer used in sealing materials, adhesives and the like, a moisture-curable compound having a hydrolyzable silicon group in the end as described in (Patent Document 1) and (Patent Document 2) is mentioned.

With respect to the oxyalkylene polymer having the hydrolyzable silicon group in the end, generally, the higher the molecular weight, the more the plasticity of the cured product is increased, but the viscosity of the compound is raised, which notably worsens the workability. When the molecular weight of such a compound is low, the viscosity is decreased, but a cured product is poor in plasticity. For providing the low viscosity while maintaining the plasticity of a cured product, various plasticizers have been so far used.

As the plasticizers, aromatic carboxylic acid esters, aliphatic carboxylic acid esters, glycol esters, phosphoric acid esters, epoxy plasticizers, chlorinated paraffins and the like have been used. However, these plasticizers have a migration property. Accordingly, when they are used as sealing materials and the like, there are drawbacks such as contamination of an area around a sealing portion and an adverse effect on an adhesion.

For solving these problems, a method using, instead of a plasticizer, an oxyalkylene polymer in which one end of a linear molecular chain is blocked with an organic group and a hydrolyzable silicon group is provided in another end (Patent Document 3), a method using a combination of a high-molecular-weight oxyalkylene polymer having a high content of a hydrolyzable silicon group per molecule and a low-molecular-weight oxyalkylene polymer having a low content of a hydrolyzable silicon group per molecule (Patent Document 4), a method using a combination of a high-molecular-weight oxyalkylene polymer having a hydrolyzable silicon group content of 50% or more per terminal group and an oxyalkylene polymer having a hydrolyzable silicon group content of less than 50% per terminal group (Patent Document 5) and the like have been proposed.

These oxyalkylene polymers with the low content of the hydrolyzable silicon group per molecule which are used instead of the plasticizer are synthesized from an oxyalkylene polymer having an active hydrogen group such as a hydroxyl group in the end and resulting from the polymerization in the presence of a catalyst such as an alkali metal catalyst, a metal porphyrin catalyst, a double metal cyanide complex catalyst or a compound catalyst having a p=N bond. Among them, when propylene oxide is used as an alkylene oxide in particular in producing an oxyalkylene polymer with a double metal cyanide complex catalyst, an unsaturated mono-ol is less by produced during polymerization, and a high-molecular-weight monodisperse oxyalkylene polymer which cannot be obtained with an alkali metal catalyst is provided. Thus, it is preferably used.

However, an oxyalkylene polymer with a low content of a hydrolyzable silicon group per molecule which polymer is used instead of a plasticizer has been so far produced by polymerization separately from an oxyalkylene polymer with a high content of a hydrolyzable silicon group per molecule and converting an active hydrogen group such as a hydroxyl group to a hydrolyzable silicon group. Later, it has been used instead of a plasticizer by being added to a relatively high-molecular-weight oxyalkylene polymer with a high content of a hydrolyzable silicon group per molecule. That is, a relatively high-molecular-weight oxyalkylene polymer with a high content of a hydrolyzable silicon group per molecule and an oxyalkylene polymer with a low content of a hydrolyzable silicon group per molecule which is used instead of a plasticizer are produced separately. Thus, a production process has been intricate.

Patent Document 1: JP-A-3-72527
Patent Document 2: JP-A-3-47825
Patent Document 3: JP-A-4-57850
Patent Document 4: JP-A-5-59267
Patent Document 5: JP-A-9-95609

DISCLOSURE OF THE INVENTION

Problems that the Invention is to Solve

Accordingly, an efficient process for producing an active hydrogen group-containing oxyalkylene polymer as a starting material for a hydrolyzable silicon group-containing oxyalkylene polymer which has a low viscosity while maintaining a plasticity of a cured product and which does not contaminate an area around a sealing portion and has no adverse effect on an adhesion has been studied, and the invention has been consequently made.

Means for Solving the Problems

That is, the invention is a process for producing an oxyalkylene polymer in which a first oxyalkylene polymer having at least two active hydrogen groups and a second oxyalkylene polymer having one active hydrogen group exist together, which process comprises reacting a first initiator having at least two active hydrogen groups and a second initiator having one active hydrogen group with alkylene oxide in the presence of a catalyst.

Effect of the Invention

According to the process of the invention, an active hydrogen group-containing oxyalkylene polymer as a starting material for a hydrolyzable silicon group-containing oxyalkylene polymer which has a low viscosity while maintaining a plasticity of a cured product and which does not contaminate an area around a sealing portion and has no adverse effect on an adhesion can be produced efficiently.

BEST MODE FOR CARRYING OUT THE INVENTION

The oxyalkylene polymer of the invention can be produced by polymerizing an initiator such as a hydroxy compound having at least one hydroxyl group with an alkylene oxide in the presence of a catalyst such as an alkali metal catalyst, a metal porphyrin catalyst (refer to gazettes of JP-A-61-197631 and the like), a double metal cyanide complex catalyst (refer to gazettes of U.S. Pat. No. 3,278,457, U.S. Pat. No. 3,278,458, U.S. Pat. No. 3,278,459, U.S. Pat. No. 3,427,256, U.S. Pat. No. 4,055,188, U.S. Pat. No. 4,721,818 and the like) or a compound catalyst having a P=N bond (refer to gazettes of JP-A-11-106500, JP-A-10-36499, JP-A-11-302371 and the like). Of these catalysts, a double metal cyanide complex catalyst and a compound catalyst having a P=N bond which can provide a high-molecular-weight, colorless oxyalkylene polymer are preferable, and a double metal cyanide complex catalyst is especially preferable.

Examples of the double metal cyanide complex catalyst include $Zn_3[Fe(CN)_6]_2$, $Zn_3[Co(CN)_6]_2$, $Fe[Fe(CN)_6]$, $Fe[Co(CN)_6]$ and the like. A catalyst having a structure that $Zn_3[Co(CN)_6]_2$ (namely, a zinc hexacyanocobaltate complex) is a catalyst skeleton and an organic ligand is coordinated is preferable.

Such a catalyst can be produced by coordinating an organic ligand in a reaction product resulting from a reaction of a metal halide salt with an alkali metal cyanometalate in water. As the metal of the metal halide salt, Zn(II) or Fe(II) is preferable, and Zn(II) is especially preferable. As the metal halide salt, zinc chloride is especially preferable. As the metal constituting the cyanometalate of the alkali metal cyanometalate, Co(III) or Fe(III) is preferable, and Co(III) is especially preferable. As the alkali metal cyanometalate, potassium hexacyanocobaltate is preferable. As the organic ligand, alcohol and/or ether are/is preferable. At least one selected from alcohols such as tert-butyl alcohol, compounds represented by the following formula 4, ethanol, sec-butyl alcohol, n-butyl alcohol, isobutyl alcohol, tert-pentyl alcohol, isopentyl alcohol and isopropyl alcohol and ethers such as ethylene glycol dimethyl ether (hereinafter referred to as glyme), diglyme (diethylene glycol diethyl ether), triglyme (triethylene glycol dimethyl ether), dioxane and polyether with Mn of from 150 to 5,000 is/are preferable.

Of these, at least one selected from tert-butyl alcohol, compounds represented by the following formula 4 and glyme is especially preferable.

$R^4$—C(CH$_3$)$_2$(OR$^5$)$_n$OH      formula 4

(wherein $R^4$ is a methyl group or an ethyl group, $R^5$ is an ethylene group or the ethylene group whose hydrogen atom is substituted with a methyl group or an ethyl group, and n is 1, 2 or 3.)

Preferable examples of the compounds represented by formula 4 include ethylene glycol mono-tert-butyl ether, propylene glycol mono-tert-butyl ether, ethylene glycol mono-tert-pentyl ether and propylene glycol mono-tert-pentyl ether. Ethylene glycol mono-tert-butyl ether is especially preferable.

The double metal cyanide complex catalyst is produced by stirring and maturing a catalyst skeleton resulting from a reaction of the metal halide salt with the alkali metal cyanometalate in the organic ligand, and then conducting separation by filtration, washing and drying in a known manner.

As the initiator, an active hydrogen-containing compound is can be used, and examples thereof include the following. Monohydric primary, secondary and tertiary alcohols such as methanol, ethanol, propanol, butanol, pentanol, hexanol, heptanol, octanol, nonanol and decanol; unsaturated group-containing monohydric alcohols such as allyl alcohol, methallyl alcohol and propenyl alcohol; unsaturated group-containing monohydric alcohols such as monoallyletherified compounds or monovinyletherified compounds obtained by monoallyletherifying or monovinyletherifying ethylene glycol, diethylene glycol, propylene glycol, dipropylene glycol, 1,3-propanediol, neopentyl glycol, 1,4-butanediol, 1,5-pentanediol, 1,6-hexanediol and 1,4-cyclohexanediol, and saturated monohydric alcohols obtained by monoalkyletherifying the same; polyhydric alcohols such as ethylene glycol, diethylene glycol, propylene glycol, dipropylene glycol, 1,3-propanediol, neopentyl glycol, 1,4-butanediol, 1,5-pentanediol, 1,6-hexanediol, 1,4-cyclohexanediol, glycerin, diglycerin, trimethylolpropane, pentaerythritol, glucose, sorbitol, sucrose and methyl glycoside; alkanolamines such as monoethanolamine, diethanolamine and triethanolamine; phenol compounds such as bisphenol A, bisphenol F, bisphenol S, resorcin and hydroquinone; aliphatic amines such as ethylenediamine, diethylenetriamine and hexamethylenediamine; and an oxyalkylene polymer obtained by a reaction of the foregoing initiators with alkylene oxide and having a lower molecular weight than the oxyalkylene polymer which is a desired product.

The foregoing initiators may be used either singly or in combination of two or more. However, as the first initiator used for polymerization of the first oxyalkylene polymer, a compound mainly containing at least two active hydrogen groups is preferable. The first oxyalkylene polymer is a component which is converted to a hydrolyzable silicon group-containing oxyalkylene polymer and cured with moisture or the like to form a rubbery elastomer. In view of its purpose, a compound mainly containing at least two active hydrogen groups is preferable.

Meanwhile, as the second initiator used for polymerization of the second oxyalkylene polymer, a compound mainly containing one active hydrogen group is preferable. The second oxyalkylene polymer has a relatively low molecular weight because it coexists for decreasing the viscosity of the oxyalkylene polymer containing the first and the second oxyalkylene polymers. For this reason, when a compound having two or more active hydrogen groups is contained in a large amount, a plasticity of the cured product of the hydrolyzable silicon group-containing oxyalkylene polymer made from the oxyalkylene polymer in which the first and second oxyalkylene polymers coexist is decreased, and a hard, brittle cured product is provided. When an oxyalkylene polymer resulting from polymerization using a compound containing one active hydrogen group as an initiator is a starting material for the oxyalkylene polymer having hydrolyzable silicon group, the plasticity of the cured product of the hydrolyzable silicone group-containing oxyalkylene polymer is not decreased even after introduction of the hydrolyzable silicone group and subsequent curing with moisture or the like. Therefore, a second initiator used for producing of the second oxyalkylene polymer is preferably a compound mainly containing one active hydrogen group. It is especially preferable to use an initiator represented by formula 1.

$R^1$—OH      formula 1

(wherein $R^1$ is a monovalent organic group free from an unsaturated group and containing at least one selected from the group consisting of carbon, hydrogen, oxygen and nitrogen as a constituent atom.)

The amount of the second initiator to be used for producing the second oxyalkylene polymer is S or less in terms of a molar ratio relative to the amount of the first initiator for producing the first oxyalkylene polymer. When the amount is more than 5, the curability of the polymer obtained by introducing the hydrolyzable silicon group into the resulting oxypropylene polymer is notably decreased, and it might not be cured in some cases. Its molar ratio is preferably 3 or less, especially preferably 2 or less.

Examples of the alkylene oxide include ethylene oxide, propylene oxide, 1,2-butylene oxide, 2,3-butylene oxide, isobutylene oxide, epichlorohydrin, epibromohydrin, methyl glycidyl ether, allyl glycidyl ether, butyl glycidyl ether, 2-ethylhexylene glycidyl ether, trifluoropropylene oxide and the like. These may be used either singly or in combination of two or more. Of these, propylene oxide is preferable.

A number average molecular weight of the first oxyalkylene polymer is preferably 4,000 or more per active hydrogen group. When it is less than 4,000, an elongation of the cured product of the oxyalkylene polymer with the hydrolyzable silicon group introduced might be decreased. The number average molecular weight is more preferably 5,000 or more, especially preferably 7,000 or more.

It is preferable that the molecular weight of the second oxyalkylene polymer is not more than 0.6 times the GPC (gel permeation chromatography) peak top molecular weight of the first oxyalkylene polymer. When it is more than 0.6 times, the effect of lowering the viscosity might be decreased. This molecular weight is more preferably at most 0.5 times, especially preferably at most 0.4 times. Meanwhile, when the molecular weight of the second oxyalkylene polymer is too low, a large amount of a silicon compound is required in converting the active hydrogen group to the hydrolyzable silicon group in the subsequent step, which leads to the increase in cost. Thus, it is practically preferable that the molecular weight of the second oxyalkylene polymer is 2,000 or more.

A process for producing the oxyalkylene polymer in which the first oxyalkylene polymer having at least two active hydrogen groups and the second oxyalkylene polymer having one active hydrogen group coexist as starting materials of the invention includes a process in which the first oxyalkylene polymer is produced by polymerizating at first using the first initiator and further the second initiator for the second oxyalkylene polymer is added (post addition process) and a process in which the first and second polymerizations is conducted simultaneously in the presence of both the first and second initiators (co-initiation process). The polymerization may be conducted by either of these processes.

In the post addition process, the GPC peak top molecular weights of the first and second oxyalkylene polymers and their ratio can arbitrarily be determined by changing the timing of adding the initiator of the second oxyalkylene polymer and the feed rate of the alkylene oxide. It can be applied as a process for effectively lowering the viscosity of the oxyalkylene polymer.

It is preferable that the initiator for the second oxyalkylene polymer is added after formation of the first oxyalkylene polymer up to approximately the intended molecular weight. When initiators different in GPC peak top molecular weight coexist in the polymerization of the alkylene oxide using the double metal cyanide complex, there is a characteristic tendency that the polymerization using the initiator having the lower molecular weight preferentially proceeds and the initiator having the higher molecular weight little proceeds. This tendency continues until the GPC peak top molecular weight ratio of the oxyalkylene polymers obtained using the initiators different in molecular weight is close to the ratio of the numbers of the active hydrogen groups of the initiators, and the molecular weights of the respective initiators are then increased while maintaining the very ratio. Accordingly, for arbitrarily determining the GPC peak top molecular weight ratio of the first and second oxyalkylene polymers, it is preferable that after the first oxyalkylene polymer is formed to approximately the intended molecular weight, the second oxyalkylene polymer is added.

The molecular weight of the second oxyalkylene polymer can freely be determined from an amount of an alkylene oxide which is fed after addition of the initiator for the second oxyalkylene polymer. The feed rate of the alkylene oxide is not more than 0.6 times the feed rate of the alkylene oxide per molar amount of the first initiator fed in the polymerization for producing the first oxyalkylene polymer. When it is more than 0.6 times, the molecular weight of the second oxyalkylene polymer is increased, so that the effect of lowering the viscosity might be decreased. The feed rate of the alkylene oxide is preferably not more than 0.5 times, especially preferably at most 0.4 times.

On the other hand, in the co-initiation process, the GPC peak top molecular ratio of the first and second oxyalkylene polymers cannot freely be determined. However, since the second oxyalkylene polymer can be formed along with the first oxyalkylene polymer, the oxyalkylene polymer in which the second oxyalkylene polymer high in both the molecular weight and its ratio coexists can be obtained easily. Since such an oxyalkylene polymer has a high molecular weight, the effect of decreasing the viscosity is low, but the amount of the hydrolyzable silicon group to be introduced is decreased because the number of the molecular end is decreased, which is economically advantageous. It can be applied as a process in which the plasticity of the cured product resulting from curing with moisture or the like after introduction of the hydrolyzable silicon group can appropriately be imparted.

It is preferable that the second oxyalkylene polymer coexists in an amount of 300 parts by weight or less per 100 parts by weight of the first oxyalkylene polymer. When the amount is more than 300 parts by weight, the curability of the polymer having the hydrolyzable silicon group introduced therein is notably decreased, and the polymer might not be cured in some cases. It is more preferably 200 parts by weight or less, especially preferably 100 parts by weight or less. However, when it is too small, the expected effect of decreasing the viscosity is not obtained. Thus, it is preferably 3 parts by weight or more, more preferably 5 parts by weight or more, especially preferably 10 parts by weight or more. It is most preferably 20 parts by weight or more.

The hydrolyzable silicon group-containing oxyalkylene polymer is obtained by introducing the hydrolyzable silicon group into the active hydrogen group-containing oxyalkylene polymer formed by the process of the invention in an suitable manner.

The introduction can be conducted by, for example, the following methods (A) to (D). When the hydrolyzable silicon group is introduced by the following method (A) or (D), the polymer is used by being converted to an unsaturated group-containing oxyalkylene polymer. In this case, however, the initiator represented by formula 1 has to be used as the initiator of the second oxyalkylene polymer having one active hydrogen group.

   formula 1

(wherein $R^1$ is a monovalent organic group free from an unsaturated group and containing at least one selected from the group consisting of carbon, hydrogen, oxygen and nitrogen as a constituent atom.)

When the second oxyalkylene polymer is formed using an initiator in which $R^1$ has an unsaturated group and the active hydrogen group contained in the second oxyalkylene polymer is converted to an unsaturated group, an oxyalkylene polymer having at least two unsaturated groups is provided. As a result, the plasticity of the cured product of the hydrolyzable silicon group-containing oxyalkylene polymer in the invention which is obtained by curing with moisture or the like is decreased, and a hard, brittle cured product is provided.

Accordingly, when the hydrolyzable silicon group is introduced by the following method (A) or (D), the initiator represented by formula 1 should be used as the initiator for the second oxyalkylene polymer having one active hydrogen group.

The introduction of the hydrolyzable silicon group by the method (B) or (C) has a defect that the viscosity tends to be more increased than the introduction of the hydrolyzable silicon group by the method (A) or (D) because of the side reaction which proceeds during the reaction of the active hydrogen group and the isocyanate compound. When using the oxyalkylene polymer in which the first and second oxyalkylene polymers having the active hydrogen groups coexist as starting materials of the invention, it is possible to decrease the viscosity of the oxyalkylene polymers having the active hydrogen groups as starting materials, which is used for effectively decreasing the viscosity of the hydrolyzable silicon group-containing oxyalkylene polymer.

(A) Method in which an active hydrogen group contained in an oxyalkylene polymer is converted to an unsaturated group to form an unsaturated group-containing oxyalkylene polymer which is then reacted with a hydrosilyl-group containing compound.

A method for introducing an unsaturated group as described herein includes a method in which a compound having an unsaturated group and a functional group is reacted with an active hydrogen group of an oxyalkylene polymer and unsaturated group is incorporated by forming them via an ether bond, an ester bond, a urethane bond, a carbonate bond or the like, a method in which an unsaturated group-containing epoxy compound such as allyl glycidyl ether is added in polymerizing an alkylene oxide to conduct copolymerization, whereby an unsaturated group is introduced into a side chain, and the like.

(B) Method in which an active hydrogen group contained in an oxyalkylene polymer is reacted with a compound represented by formula 2.

$$R_{3-a}\text{—SiX}_a\text{—}R^3\text{NCO} \qquad \text{formula 2}$$

wherein R is a substituted or unsubstituted monovalent organic group having from 1 to 20 carbon atoms, X is a hydrolyzable group, a is 1 to 3, and $R^3$ is a substituted or unsubstituted divalent organic group having from 1 to 20 carbon atoms.

(C) Method in which an active hydrogen group contained in an oxyalkylene polymer is reacted with a polyisocyanate compound such as tolylene diisocyanate to convert it to an isocyanate group, and the isocyanate group is then reacted with a W group of a silicon compound represented by formula 3.

$$R_{3-a}\text{—SiX}_a\text{—}R^3W \qquad \text{formula 3}$$

wherein R, $R^3$, X and a are as defined above, and W is an active hydrogen-containing group selected from a hydroxyl group, a carboxyl group, a mercapto group and an amino group (primary or secondary).

(D) Method in which an active hydrogen group contained in an oxyalkylene polymer is converted to an unsaturated group, and the unsaturated group is reacted with a silicon compound represented by formula 3 in which W is a mercapto group.

The active hydrogen group-containing oxyalkylene polymer of the invention is especially useful as a starting material for elastic sealants and adhesives and can be used as a starting material for sealants and adhesives of buildings, ships, automobiles, roads and the like. It is useful as a starting material for construction sealants requiring non-contamination of a paint or non-contamination of an area around a joint when coating a paint on a surface in particular. It is especially useful as a starting material for sealants for siding board joint or sealants for stone joint. Further, it can be used as a starting material for usual adhesives and contact adhesives. Still further, it is useful as a starting material for food packaging materials, casting rubber materials, templating materials, paints and the like.

EXAMPLE

The invention is illustrated below by referring to Examples. However, the invention is not limited at all by these Examples. Incidentally, in case of a hydroxyl group-containing oxyalkylene polymer, the number average molecular weight is measured as follows. Assuming the end structure is compsoed of a hydroxyl group and an unsaturated group, the amount of the hydroxyl group is measured according to JIS K 1557, and the amount of the unsaturated group according to JIS K 0070. The number average molecular weight is defined as a molecular weight measured in consideration of the end number of the initiator. A GPC (gel permeation chromatography) peak top molecular weight (hereinafter referred to as GPCMp) and a molecular weight distribution (Mw/Mn) were determined on polystyrene equivalent basis value measured with a GPC analyzer using tetrahydrofuran as a solvent. Using a regression correlation of the GPC peak top molecular weight and the number average molecular weight obtained in advance, the number average molecular weight can be estimated. A viscosity was measured at 23° C. using an E-type viscometer.

Example 1

Synthesis of an Oxyalkylene Polymer>

50 g of polyoxypropylenediol having a number average molecular weight of 2,000 was used as an initiator of a first oxyalkylene polymer, and reacted with 950 g of propylene oxide (hereinafter referred to as PO) in the presence of a double metal cyanide complex catalyst to obtain a first oxyalkylene polymer having GPCMp of 40,000 and a viscosity of 150 Pa·s. As an initiator of a second oxyalkylene polymer, 8 g of butanol was added thereto, and the mixture was reacted with 315 g of PO to obtain an oxyalkylene polymer in which the second alkylene polymer having GPCMp of 4,000 coexisted. The viscosity of the oxyalkylene polymer (P-1) in which the first oxyalkylene polymer and the second oxyalkylene polymer coexisted was 72 Pa·s.

The invention claimed is:

1. A process for producing an oxyalkylene polymer in which a first oxyalkylene polymer having at least two active hydrogen groups and a second oxyalkylene polymer having one active hydrogen group coexist, which comprises reacting an alkylene oxide with a first initiator having at least two active hydrogen groups and a second initiator having one active hydrogen group in the presence of a catalyst.

2. The process for producing the oxyalkylene polymer according to claim 1, wherein a GPC (gel permeation chromatography) peak top molecular weight of the second oxyalkylene polymer is not more than 0.6 times a GPC peak top molecular weight of the first oxyalkylene polymer.

3. The process for producing the oxyalkylene polymer according to claim 1, wherein a viscosity of the oxyalkylene polymer in which the first and second oxyalkylene polymers coexist is not more than ¾ a viscosity of the first oxyalkylene polymer.

4. The process for producing the oxyalkylene polymer according to claim 1, wherein 100 parts by weight of the first oxyalkylene polymer and not more than 300 parts by weight of the second oxyalkylene polymer coexist.

5. The process for producing the oxyalkylene polymer according to claim 1, wherein after the alkylene oxide is reacted with the first initiator, the second initiator is added, and then the alkylene oxide is further reacted with the mixture.

6. The process for producing the oxyalkylene polymer according to claim 5, wherein a feed rate of the alkylene oxide per molar amount of the second initiator after addition of the second initiator is not more than 0.6 times a feed rate of the alkylene oxide per molar amount of the first initiator before addition of the second initiator.

7. The process for producing the oxyalkylene polymer according to claim 1, wherein allowing the first initiator and the second initiator coexist and the alkylene oxide react in the presence of the catalyst.

8. The process for producing the oxyalkylene polymer according to claim 1, wherein a second initiator represented by formula 1 is used, $$R^1\text{---OH} \qquad \text{formula 1}$$

(wherein $R^1$ is a monovalent organic group free from an unsaturated group and containing at least one selected from the group consisting of carbon, hydrogen, oxygen and nitrogen as a constituent atom.

9. The process for producing the oxyalkylene polymer according to claim 1, wherein the catalyst is a double metal cyanide complex catalyst.

* * * * *